United States Patent
Lill

(10) Patent No.: US 10,330,237 B2
(45) Date of Patent: Jun. 25, 2019

(54) PIPE LINING MATERIAL FOR USE FOR AT LEAST TWO PREDEFINED PIPELINE NOMINAL WIDTHS

(71) Applicant: Karl Otto Braun GmbH & Co. KG, Wolfstein (DE)

(72) Inventor: Michael Lill, Kaiserslautern (DE)

(73) Assignee: Karl Otto Braun GmbH & Co. KG, Wolfstein (DE)

( * ) Notice: Subject to any disclaimer, the term of this patent is extended or adjusted under 35 U.S.C. 154(b) by 16 days.

(21) Appl. No.: 15/740,444

(22) PCT Filed: Jun. 29, 2016

(86) PCT No.: PCT/EP2016/065140
§ 371 (c)(1),
(2) Date: Dec. 28, 2017

(87) PCT Pub. No.: WO2017/001475
PCT Pub. Date: Jan. 5, 2017

(65) Prior Publication Data
US 2018/0187817 A1    Jul. 5, 2018

(30) Foreign Application Priority Data

Jun. 29, 2015 (DE) .......... 10 2015 212 025

(51) Int. Cl.
*F16L 55/165* (2006.01)
*B32B 1/08* (2006.01)
(Continued)

(52) U.S. Cl.
CPC ............ *F16L 55/1656* (2013.01); *B32B 1/00* (2013.01); *B32B 1/08* (2013.01); *B32B 5/026* (2013.01);
(Continued)

(58) Field of Classification Search
CPC .... F16L 55/1656; F16L 55/1654; B32B 1/08; B32B 1/00; B32B 5/04; B32B 5/26;
(Continued)

(56) References Cited

U.S. PATENT DOCUMENTS

| 4,576,205 A | 3/1986 | Morinaga et al. |
| 5,501,248 A | 3/1996 | Kiest, Jr. |

(Continued)

FOREIGN PATENT DOCUMENTS

| DE | 29807747 U1 | 7/1998 |
| DE | 19950683 A1 | 5/2001 |

(Continued)

OTHER PUBLICATIONS

Grundlagen der Maschenwarentechnologie, Nov. 30, 1977, pp. 118-119.
(Continued)

*Primary Examiner* — Michael C Miggins
(74) *Attorney, Agent, or Firm* — Dilworth & Barrese, LLP.

(57) ABSTRACT

The invention relates to a pipeline lining material for use for at least two, preferably three, predefined pipeline nominal widths, comprising an elastic round knitted material, which is knitted under pretension so as to contract to an untensioned diameter of +/–10% of the smallest predefined pipeline nominal width after being knitted, and comprising an elastically flexible film tube arranged around the round knitted material. The pipe lining material can be expanded by at least 50% in the transverse direction under a pressure of maximally 0.7 bar, at which the untensioned round knitted material maximally has a diameter that is reduced by 55% compared to the round knitted material under pretension.

20 Claims, 1 Drawing Sheet

(51) Int. Cl.
*B32B 1/00* (2006.01)
*B32B 5/04* (2006.01)
*B32B 5/26* (2006.01)
*B32B 7/04* (2019.01)
*B32B 7/12* (2006.01)
*B32B 27/08* (2006.01)
*B32B 27/12* (2006.01)
*B32B 27/32* (2006.01)
*B32B 27/34* (2006.01)
*B32B 27/36* (2006.01)
*B32B 27/40* (2006.01)
*B32B 5/02* (2006.01)

(52) U.S. Cl.
CPC ............... *B32B 5/04* (2013.01); *B32B 5/26* (2013.01); *B32B 7/04* (2013.01); *B32B 7/12* (2013.01); *B32B 27/08* (2013.01); *B32B 27/12* (2013.01); *B32B 27/32* (2013.01); *B32B 27/34* (2013.01); *B32B 27/36* (2013.01); *B32B 27/40* (2013.01); *F16L 55/1654* (2013.01); *B32B 2260/021* (2013.01); *B32B 2260/046* (2013.01); *B32B 2262/0215* (2013.01); *B32B 2262/0276* (2013.01); *B32B 2262/14* (2013.01); *B32B 2307/30* (2013.01); *B32B 2307/50* (2013.01); *B32B 2307/51* (2013.01); *B32B 2307/54* (2013.01); *B32B 2307/7265* (2013.01); *B32B 2307/732* (2013.01); *B32B 2597/00* (2013.01)

(58) Field of Classification Search
CPC .. B32B 7/04; B32B 7/12; B32B 27/08; B32B 21/12; B32B 27/32; B32B 27/34; B32B 27/36; B32B 27/40; B32B 5/026; B32B 2307/30; B32B 2307/50; B32B 2597/00; B32B 2260/021; B32B 2260/046; B32B 2262/0215; B32B 2262/0276; B32B 2307/51; B32B 2307/54; B32B 2307/7265; B32B 2307/732; B32B 2262/14

See application file for complete search history.

(56) References Cited

U.S. PATENT DOCUMENTS 5,941,285 A   8/1999   Cant
6,129,119 A   10/2000  Schwert et al.
6,170,531 B1  1/2001   Jung et al.

FOREIGN PATENT DOCUMENTS

DE   69527114 T2   10/2002
EP   0875713 A2   11/1998
WO   0015992 A2    3/2000

OTHER PUBLICATIONS

International Search Report and Written Opinion from PCT/EP2016/065140 dated Sep. 10, 2016 with English Translation of International Search Report provided.

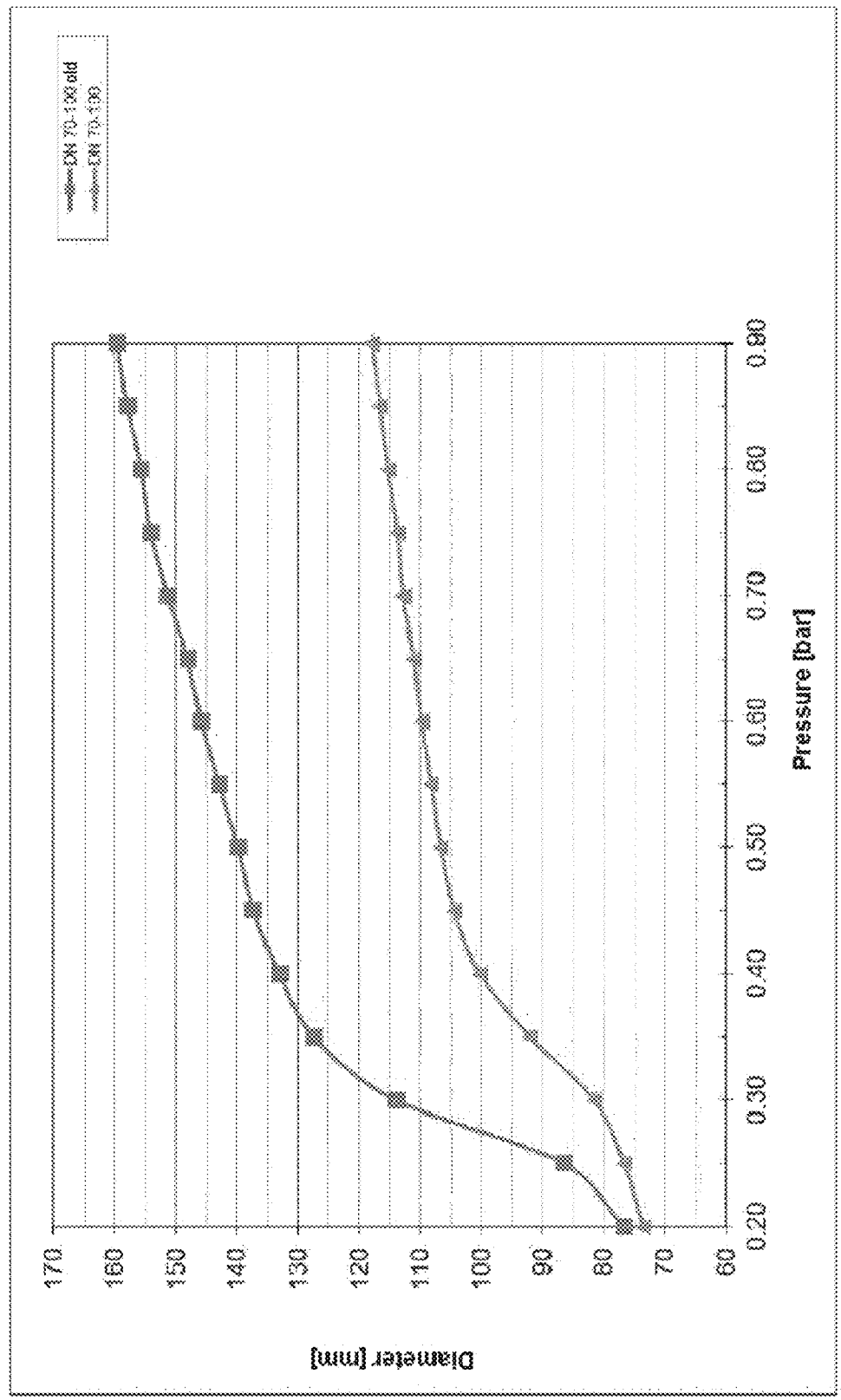

PIPE LINING MATERIAL FOR USE FOR AT LEAST TWO PREDEFINED PIPELINE NOMINAL WIDTHS

This application claims priority to German Patent Application No. 102015212025.2 filed on Jun. 29, 2015.

The invention relates to a pipe-lining material for use; for at least two, preferably three predefined nominal pipeline widths comprising an elastic circular-knit material knitted under pre-tension such that, after knitting, it contracts to a relaxed diameter of +/−10% of the smallest predefined nominal pipeline width, and also an elastically extensible film tube arranged about the circular-knit, material, wherein the pipe-lining material is at least 50% widenable in the transverse direction at a pressure of not more than 0.7 bar. The pipe-lining material in question is the ready-produced pipe-lining material consisting of circular-knit material and film in a relaxed state as present before installation.

Such a pipeline-lining material is particularly for lining sewer and/or pipe lines in need of remediation, which are referred to hereinafter as pipelines.

The invention further relates to the method of using such a pipeline-lining material and also to its method of making.

In the remediation of covered sewers and pipelines, in particular domestic sewers and drains, of low pipe diameter, as for example hidden in brick masonry or buried in earth, remediation by removing and replacing the defective portions is costly and inconvenient. This is because the required excavatory and/or prising-open works are time consuming and cost intensive, frequently difficult to carry out and necessitate special measures to protect from soiling, especially with works carried out inside a built structure. The building sites created as a result-further pose a potential source of hazard and are a nuisance to the surrounding area. There is accordingly a great need for alternative structural procedures that enable a pipeline to be lined without having to uncover the line and possibly remove and replace parts of the line.

Various pipe-lining methods have become known to date, as have various materials used for this purpose.

EP 0 875 713 B1 for instance discloses a material which consists of a tubular plush textile material and also comprises a film tube arranged coaxially and to be freely movable, and the plush textile material has an extensibility of 10 to 70% in the longitudinal direction and of 50 to 200% in the transverse direction, while the force needed to extend the film tube in the longitudinal and transverse directions by 40% does not exceed a magnitude of 10 N/cm.

Such a material is made in a seamless form by circular knitting and consists of a fabric ground and one- or both-sided thread strips (pile loops) which protrude from the fabric ground and a preferably firmly attached seam-free film arranged thereabout. Such a material particularly also makes it possible to provide linings in pipelines that display highly angled bends of, for example, 90°.

In this context, it had already been known in the prior art to produce pipeline-lining materials suitable for use of two or more predefined nominal pipeline widths, wherein the materials are seamlessly knitted as a round material under pre-tension, these round materials being knitted such that the knitting head in essence corresponds to the largest of the targeted nominal pipeline widths (pipe inside diameters) and more particularly is chosen to be about ⅓ larger than the largest nominal width.

Pipeline-lining materials of this type offer the in-principle advantage that a separate lining material does not have to be provided and stocked for every nominal pipeline width, but stockholding can be optimized by using one material for two or three nominal pipeline widths.

One disadvantage with the existing pipeline-lining materials useful for two or more predefined nominal pipeline widths is the appreciable elasticity of the material which has to be able to contract from the knitting diameter of the circular-knit material, which is larger than the largest predetermined nominal width, down to the smallest desired pipeline inside diameter (nominal pipeline width) that is predefined. While the high elasticity of the pipeline-lining material is advantageous for the bend navigation of the ready-produced pipeline-lining material during its process of installation, it does, on the other hand, involve the risk of bursting, since the material is capable of extreme expansion. The material is further difficult to manage in terms of its length, so it may happen that the material stretches too far into branches off the pipelines when the material excessively lengthens, and penetrates into these branches, during its installation, this in turn entailing burdensome clearing work with the milling cutter.

Proceeding from this known material for use for two or more predefined nominal pipeline widths, therefore, the invention addresses the problem of providing a material which is better manageable in respect of the risk of bursting and also of lengthening.

BRIEF DESCRIPTION OF THE FIGURE:

FIG. 1 is a diagram which illustrates the extension behavior of the lining material according to the present invention for three nominal pipeline widths DN70 to DN100 (identified as "DN70-100") and, for comparison, the behavior of a material obtained by the old method.

The invention solves this problem by providing an elastic pipe-lining material, wherein the pipe-lining material is at least 50% widenable in the transverse direction at a pressure of not more than 0.7 bar, preferably at a pressure of 0.6 bar and more preferably at a pressure of 0.5 bar, so at least two predefined nominal pipeline widths are coverable thereby, wherein the relaxed circular-knit material at most displays a 55%, especially at most 50%, especially at most 45%, especially by 45%-50%, especially at most by 35% smaller diameter than the pre-tensioned circular-knit material and displays a transverse extensibility of 100%±20%, especially 100%±10%. The relaxed circular-knit material preferably displays an at least 5%, especially at least 10%, especially at least 15%, especially at least 20%, especially at least 25% and more especially at least 30% lower diameter than the pre-tensioned circular-knit material. The extensibility of the lining material is determined using the extension test method described hereinafter. The transverse extensibility of the circular-knit fabric is determined using the transverse extension test described.

A circular-knit material of this type has a construction such that, starting from the pre-tensioned state in the production process, it contracts less than prior art circular-knit materials, while the circular-knit material has more particularly been produced such that it is knitted on a knitting head with a diameter corresponding to ±10% of the central diameter between the largest and the smallest predetermined pipeline inside diameters (nominal pipeline widths), so, starting therefrom, contraction by merely half the entire spectrum of the nominal pipeline widths to be covered is necessary. The expansion to the largest possible nominal pipeline width predefined then takes place by utilizing the elasticity of the material. Here it is essentially the circular-knit material which determines the extensibility of the pipe-lining material in the longitudinal and transverse directions.

In this way, the yarn component that is elastic has a lower pre-tension during knitting and the overall material has to more particularly contract less than the prior art material.

This reduction in the elasticity of the material has the effect that the extensibility in the longitudinal direction is better manageable, as is the extensibility in the transverse direction. In addition, owing to the lower degree of necessary contraction, yarns having a higher thickness and hence a higher breaking strength can be used, so the burst resistance of the entire pipeline-lining material can be enhanced.

The transverse extensibility test of the transverse extensibility of the circular-knit fabric is carried out via an in-house method under the following conditions: temperature 20° C.+/−2° C. and relative humidity (rh) 55%+/−5%). A horizontal force-extension facility is used for this test. It consists essentially of a test table having a firmly attached measuring tape, one fixed and one roller-mounted retainer with a holder for the test specimen and, at the end of the test table, a weight of 20 kg (corresponding to 10 N/cm), which is connected to the mobile retainer.

A knit-tube section 20 cm in length is hooked transversely into the two holders for the test specimen. The weight is then actuated, so the mounted retainer moves until the maximum possible extension of the tube is reached. The extended length can thus be read off directly. Transverse extensibility is given as the ratio of the extended state to the unextended state (target breadth). This target breadth is used as the reference base irrespective of the actual breadth, which may differ from the actual breadth.

It can in this context be provided that the circular-knit material pre-tensioned in the course of its production is relaxable to a diameter of ±10%, preferably ±5% of the smallest predefined nominal pipeline width and contracts to this size after production. This relaxed circular-knit material may more particularly have a not more than 55% smaller diameter than the pre-tensioned circular-knit material in the production process, more preferably a 50% smaller diameter and especially a 45 to 50% and especially not more than 45%, especially not more than 35% smaller diameter than the pre-tensioned circular-knit material in production. Preferably, the relaxed circular-knit material has an at least 5%, especially at least 10%, especially at least 15%, especially at least 20%, especially at least 25% and further especially at least 30% smaller diameter than the circular-knit material under pre-tension in production.

This circular-knit material may preferably be a plush textile tube. A textile tube of this type is seamlessly produced in a circular-knit process. What is meant thereby is a circular-knitted fabric where thread strips (pile loops) protrude out of the fabric ground in a one- or both-sided manner. Selecting the knitting parameters in a suitable manner for the particular fibrous starting material used will establish the mechanical properties for the textile tube which are required for attaining the effect of the invention.

The fiber materials used for the textile tube may be any desired manufactured fiber materials provided they display sufficient resistance to the medium surrounding the device to be lined with the lining material.

Preferred fiber materials are elastane, polyester, polyester (high-tenacity), aramid, polyamide, polyurethane, glass fibers, basalt, carbon fibers and also metal yarns and wires. In particular, various materials are usable in the ground weave, as are further materials for the loops.

The production of a lining out of the lining material of the present invention preferably proceeds according to a method wherein the resin-impregnated, especially epoxy resin impregnated, lining material is introduced, under pressurization in an inversion tube, into the volume to be lined, while the lining material is everted from in to out and pressed against the wall of the volume to be lined.

For this, the extensibility of the pipe-lining material has been adjusted so as to, on the one hand, ensure that even 90° bends are lineable with the lining material of the invention such that the pipe-lining material is at all times in close apposition to the wall. On the other hand, excessive extension is undesirable. The values of the extensibility in the longitudinal direction at 0.6 bar are preferably not more than 15%, especially not more than 10%.

The method of measurement used is again the method described under extension test methods.

The preferably maximal adjustability of the extension in the transverse direction to not more than 80% of the diameter of the relaxed pipe-lining material at a pressure of 0.9 bar, preferably to 65% to 80% at 0.9 bar or to not more than 65% at 0.5 bar, preferably 40% to 60% at 0.5 bar, based on the smallest nominal width of the predetermined nominal pipeline widths, ensures that the pipeline-lining material to be used to produce pipeline linings is pressed to a desired defined degree into lateral branches, as a result of which the add-on of material is thinner in the direct transition of the to-be-lined pipelines to the branches off than in the remaining volume to be lined, as a result of which quasi-seamless transitions from one line into the other are easier to create in subsequent steps. Extension is determined according to the extension test method described.

It is provided in this context that an elastically extensible film tube is arranged about the circular-knit material. The film tube should display some thermal stability, just like the textile tube of the lining material according to the present invention. Various thermal stabilities may be required depending on the curing temperature of the resin composition.

For this, the film tube is used together with the textile tube and a preferred embodiment may provide that the textile tube is laminated with the film tube, laminated to be understood as meaning a partial or full-areal adhesive bonding together of two sheets.

Here the film material shall have a sealing function during installation in particular. The film tube therefore preferably has a very low gas or liquid perviousness, especially water perviousness, depending on the intended use. After installation, it is especially the resin applied to the textile material which determines tightness.

Within this framework, the material of which the film tube consists is largely capable of being varied, in which case ecological aspects may additionally play a part. However, the film tube should be compatible with the curable resin composition with which the textile material is impregnated, in that, more particularly, it has to be reliably adherable with the resin, so the film tube will not later detach from the textile material.

With regard to the materials customarily used for resin compositions, polyester, polyurethane, polyesterurethane, polyamide, polyethylene, polypropylene are preferable for the film tube. It is further also possible to employ multiply films of these materials, in which case even plies of different materials are combinable. There are also special applications where film tubes of silicone resin can be used.

Film tube thickness is selectable according to the tightness properties desired and the compatibility with the resin composition to be used and the extensibility of the film tube. Film tube thicknesses of 50 to 250 μm, especially of 80 to 200 μm, are generally preferable.

It may be provided in this context that the extensibility values of the film tube in the longitudinal and transverse directions are above those of the textile material. Preferably, the film material has a stress at 50% extension, as measured to DIN EN ISO 527-3, of <10 MPa, preferably <7 MPa. The stress is measured at a room temperature of 20° C.+/−2° C. and a relative humidity of 55%+/−5% using three sample specimens having a rectangular shape with a breadth of 5 cm and a length of 20 cm for tube diameters greater than 80 mm and a length of 10 cm for tube diameters less than 80 mm.

Just as with the textile material, the extension of the entire material for pipe lining including the film material by at least 50% in the transverse direction at a pressure of not more than 0.7 bar, preferably 0.6 bar and further preferably not more than 0.5 bar is also realizable. The test method is described hereinafter in connection with the working example (extension test method).

A pipe lining is produced with the lining material of the present invention as follows:

a) impregnating a lining material comprising the circular-knit material and the film tube in a suitable longitudinal and diametral sizing for the intended individual use with a curable resin composition (impregnant), b) introducing the impregnated lining material from step a) into an inversion pressure tube, c) pressing the assembly from step b) by means of a pressure-driven inversion process into the pipe section to be lined, and d) curing the impregnant while maintaining, in the inversion tube, a pressure which ensures the impregnated lining material being pressed against the wall of the pipe section.

The composite combining knit material and film tube is preferably produced by lamination.

This method is capable of producing linings which appose the wall of the lined cavity closely and nearly creaselessly in all regions, even in critical regions, as in bends of up to 90°, in regions in which the diameter of the lined cavity is narrowed or widened, and also in regions of branches going off or sidelines entering. The method is particularly useful for lining sewers and pipes having an inside diameter of 25 to 800 mm, especially 50 to 400 mm and especially 70 to 250 mm.

Preferably, to achieve particularly advantageous results, the lining material employed in the above method is dimensioned such that the unextended textile tube and the unextended film tube conjointly each have one diameter which is more particularly 10%, preferably 5% smaller than the inside diameter of the pipe to be lined.

It is further possible to include customary types of method steps, for example the step of installing a preliner and also the step of readying the corresponding pipelines.

The resin composition used may be a commercially available resin system for the corresponding purpose. Resin systems preferred according to the invention are cold-curing epoxy resins, cold-curing unsaturated polyester resins (UP resins), UV-curing UP resins and PU resins.

The lining material of the present invention is widely employable in the production of linings, especially of sewer and pipe linings of public or private wastewater systems. They are useful for repairing and remediating clapped-out line systems, for example ventilation pipes, wastewater lines, gas lines, off-gas lines and liquid-transporting lines, and enable the provision of a close-fitting and nearly creaseless lining to the particular system, even if this system has geometrically difficult passages, such as narrowings or widenings of the pipe diameter, bends, etc. or other irregularities. But the pipe-lining material is also deployable with advantage in pipes for corrosion control, for example.

A particularly advantageous aspect of the invention here is that the pipeline-lining material is produced such that it is usable for at least two, but preferably three, predefined nominal pipeline widths and thus but a single lining material has to be stocked per two or three, respectively, lineable nominal pipeline widths.

The ground material therein consists of an elastic type of thread material and also an inelastic stopping thread (extension-limiting thread), which prevents any further extension beyond the envisaged maximum extension not only in the longitudinal direction but also, in particular, in the transverse direction and serves as an extensibility barrier or limiter.

In addition to preventing any further extension and hence safeguarding against bursting, the effect of the stopping thread, but also of the elastic thread as well as the loops, is also such that any further contraction of the ground material than indicated above is mechanically blocked.

The stopping thread here may have a different, for example higher, thread linear density than the remaining elastic fraction of the ground knit material, which may be configured as extensible material in particular.

The ground knit material has additionally introduced into it loops which, in particular, have an inelastic configuration and via which the ability to take up the resin is enhanced.

To ensure that the knit will contract to the stipulated breadth immediately on leaving the knitting head, the elastic, stitch-forming element of the circular-knit material is continuously fed at a defined thread tension using an electronic type of thread feeder, having an "ULTRAFEEDER" integrated control system from BTSR®, Olgiate Olona, Italy. Depending on the thickness of the material and the stipulated final breadth of the knit tube, the electronic thread feeder is adjusted to an equivalent-force setting of 5 to 24 g (corresponding to about 50-240 cN).

A method of using a pipeline-lining material for lining pipelines may further be provided wherein in each case three predefined nominal pipeline widths are coverable by one circular knit material. For instance, the nominal widths DN 70, DN 80 and DN 100 can be covered by a single pipeline-lining material. The nominal widths come from the following standard: DIN EN ISO 6708.

The invention more particularly also provides a method of producing a circular-knit material for use with pipelines having at least two, preferably three predefined nominal pipeline widths for one pipe-lining material especially as claimed in any preceding claim comprising the steps of a) knitting the circular-knit material out of a ground, knit material and a pile loop material as plush textile tube under pre-tension with a diameter essentially centrally between the largest and the smallest predefined nominal pipeline widths, b) allowing the circular-knit material to contract to a diameter of +/−10%, preferably +/−5% of the smallest predefined nominal pipeline width, c) laminating the overall knit tube with a seamless film tube, this process being carried out in two or more stages or in one operation, with partial or full-areal adhesive bonding together of the two materials.

Here "essentially centrally" is also to be understood as meaning that a machine-based deviation of up to ½" preferably ¼" is allowed. The nearest ¼" size is generally chosen because of the inch-based scale divisions.

The thread tension and also the material for the circular-knit material may here be selected as described above for the pipe-lining material. This process can be carried out in two or more stages or in one operation. The knit tube is seamlessly bonded to the film by means of an adhesive medium, preferably an adhesive film, especially of a thermoplastic material. The adhesive bond may be effected not only partially but also uninterruptedly.

When the desired breadth is not solely attainable via the knitting method, there is additionally the possibility of thermal after treatment. It is used to release the latent stresses present in the knit tube. Heating may cause some appreciable shrinking, the extent of which may depend on fiber species, fiber type and fabric construction.

The treatment step may, for example, take the form of tumbling. Here "tumbling" is to be understood as meaning a drying process wherein the textile good is dried by hot air being blown in. Depending on the material used, advisable temperatures range from 90 to 250° C., preferably 100 to 200° C., especially from 120 to 160° C.

The invention will now be more particularly described with reference to an example of a pipe-lining material that covers the nominal pipeline widths DN70, DN80 and DN100:

Using a circular-knit material to produce a pipe-lining material would require a knitting machine having a knitting head diameter of 3¾" for a pipeline sized DN70 or 2½" and a corresponding knitting head diameter of 5¼" for a DN100. In order, then, to realize a pipe-lining material useful for both DN70 and DN100, the knitting head chosen in the underlying invention is between the sizes, preferably essentially centrally, as explained above.

In this case, therefore, the circular-knit, material would ideally be produced in the form of a plush textile tube on a knitting head having a diameter of 4½.

In order that the tube may contract to the size of the DN70 pipe with an approximately 90 mm lay-flat breadth of the knit tube, an elastic thread is knitted into the ground material or ground. The construction of such a plush textile tube may be as follows:

EXAMPLE

Ground knit material: about 23 tex (extended) wrapped elastane

About 55 tex PES high-tenacity (in each case one thread/system)

Loop piles: about 30 tex PES high-tenacity (in each case one thread/system), about 55 tax PES high-tenacity (in each case 2 threads/system)

Structure: plain
Number of courses/10 cm: 38 to 46
Traverse extension: (100±20)%
Basis weight: 2400 to 2900 g/m$^2$.

Depending on the diameters desired, an adjustment may be made in the thread selection, namely the number of threads per system and optionally the thread linear density.

The plush tube is then, in a further processing step, laminated with a seamless tubular film. A seamlessly extruded film tube of thermoplastic polyurethane is selected according to the nominal width in the matching breadth, here with a lay-flat breadth of 95 mm+/−5 mm and a thickness of about 100+/−5 µm. A thermoplastic adhesive is used to bond film tube and knit tube together.

Extension Test Method:

The extension test described hereinafter is for the internal quality control of the pipeline-lining material and is carried out at a room temperature of 20° C.+/−2° C. and a relative humidity of 55%+/−5%. It also is the method for determining the expansion (widening) by 50% at a defined pressure, as used to characterize the pipe-lining material. The longitudinal extension according to the invention is likewise determined with this method. It reflects the behavior of the lining material during installation. For this, a defined length of the already film tube-laminated lining material, in particular 2.7 m, is measured out and optionally provided a lubricant, for example silicone spray. The defined, piece is then put into the inversion drum and inverted with a light pressure of 0.1 bar. A sector of 1 m is then marked out centrally on the lining material, this sector being remeasured again and again, with a flexible measuring tape, during the experiment together with the circumference.

The pressure is then raised incrementally in 0.05 bar steps until the maximum pressure of 0.9 bar is reached. Measurement starts here at 0.2 bar. Once the next higher pressure, for example 0.2 bar, is reached, first 60 seconds are counted down at this level in order that the lining material may conform to the new pressure level, then the length and circumference are recorded and the next higher pressure level, for example 0.25 bar, is targeted. It will generally have been reached after about 60 seconds in each case. What is important with this test is that, firstly, the lining material is still tight, i.e. must not allow any air to escape, after 0.9 bar and, secondly, the largest pipe diameter possible with this lining material, i.e., an approximately 50% widening of the diameter versus the smallest diameter, is reached at a pressure of 0.4 to 0.5 bar.

The longitudinal elongation should be as small as possible, preferably not more than 6% at 0.3 bar.

The accompanying FIGURE hereinafter is a corresponding diagram which illustrates the extension behavior of the lining material according to the present invention for three nominal pipeline widths DN70 to DN100 (identified as "DN70-100") and, for comparison, the behavior of a material obtained by the old method (identified as "DN70-100 old"), wherein the circular-knit material was produced on a knitting head which in terms of its diameter corresponds to the largest nominal width at which the pipe-lining material is supposed to be used. What is clearly apparent here is the lower overall extensibility, yet which is sufficient to ensure an adequate level of curve navigation ability, while, however, the lower extensibility has raised the burst resistance and made the longitudinal extension better manageable.

What is claimed is:

1. A pipeline-lining material for use for at least two, predefined nominal pipeline widths comprising
   an elastic circular-knit material knitted under pre-tension such that, after knitting, it contracts to a relaxed diameter of +/−10% of the smallest predefined nominal pipeline width, and
   an elastically extensible film tube arranged about the elastic circular-knit material, wherein the pipe-lining material is at least 50% widenable in the transverse direction at a pressure of not more than 0.7 bar, and wherein the relaxed circular-knit material at most displays a 55% smaller diameter than the pre-tensioned circular-knit material.

2. The pipeline-lining material of claim 1, wherein the circular-knit material is a plush textile tube.

3. The pipe-lining material of claim 1, which is for three predefined nominal pipeline widths.

4. The pipeline-lining material of claim 1, wherein the circular-knit material comprises a ground material having an elastic system of threads, an inelastic extension-limiting thread, and a pile loop material incorporated therein.

5. The pipeline-lining material of claim 4, wherein the ground material limits the extension in the transverse direction to not more than 80% of the diameter of the pipe-lining material at a pressure of 0.9 bar.

6. The pipeline-lining material of claim 4, wherein any further contraction of the pipe-lining material is limited by the circular-knit material.

7. The pipe-lining material of claim 6, wherein the further contraction of the pipe-lining material is limited by the inelastic extension-limiting thread of the circular knit material.

8. The pipeline-lining material claim 4 wherein the thread-pulling force of the elastic thread of the circular-knit material in the course of production is 50-240 cN.

9. The pipe-lining material of claim 8 wherein the thread-pulling force of the elastic thread of the circular-knit material in the course of production is 50-150 cN.

10. The pipeline-lining material, of claim 4 wherein the inelastic extension-limiting thread in the circular-knit material has a linear density of 200-2000 dtex.

11. The pipe-lining material of claim 10 wherein the inelastic extension-limiting thread in the circular material has a linear density of 450-1000 dtex.

12. The pipe-lining material of claim 10 wherein the inelastic extension-limiting thread in the circular material has a linear density of 500-600 dtex.

13. The pipeline-lining material of claim 1 wherein the maximum extension of the pipe-lining material in the longitudinal direction does not exceed 15%, at a pressure of 0.6 bar.

14. The pipe-lining material of claim 13 wherein the maximum extension of the pipe-lining material in the longitudinal direction does not exceed 10% at a pressure of 0.6 bar.

15. A method of using the pipeline-lining material of claim 1 wherein the pipeline-lining material is used for lining pipelines and in each case three predefined nominal pipeline widths are coverable by one pipe-lining material.

16. A method of producing the pipe-lining material of claim 1 comprising the steps of:
knitting the circular-knit material out of a ground material and a pile loop material as plush textile tube under pre-tension with a diameter centrally between the largest and the smallest predefined nominal pipeline widths,
allowing the circular-knit material to contract to a diameter of +/−10% of the smallest predefined nominal pipeline width.

17. The method of claim 16 wherein the circular-knit material is laminated with an elastic film tube to produce the pipeline-lining material.

18. The method of claim 16 wherein the thread-pulling force of the elastic thread of the circular-knit material in the course of production is 50 to 240 cN.

19. The method of claim 16 wherein the ground material includes an elastic thread and also an inelastic extension-limiting thread.

20. The method of claim 16 wherein the step of allowing the circular-knit material to contract is to a diameter of +/−5% of the smallest predefined nominal pipeline width.

* * * * *